United States Patent
Li et al.

(10) Patent No.: US 10,326,363 B2
(45) Date of Patent: Jun. 18, 2019

(54) METHOD AND APPARATUS FOR BYPASSING CURRENT GENERATION IN PARALLEL WITH SWITCHING REGULATOR

(71) Applicant: AVAGO TECHNOLOGIES INTERNATIONAL SALES PTE. LIMITED

(72) Inventors: Shengyuan Li, Irvine, CA (US); Junjie Lu, Irvine, CA (US); Cheng Huang, San Jose, CA (US); Xiaofeng Lin, Irvine, CA (US); Leon Samuel Wang, Irvine, CA (US); Xicheng Jiang, Irvine, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/815,185

(22) Filed: Nov. 16, 2017

(65) Prior Publication Data
US 2018/0198274 A1 Jul. 12, 2018

Related U.S. Application Data

(60) Provisional application No. 62/443,209, filed on Jan. 6, 2017.

(51) Int. Cl.
| | | |
|---|---|---|
| *H02M 3/157* | (2006.01) | |
| *H02H 9/02* | (2006.01) | |
| *H02H 1/00* | (2006.01) | |
| *H02M 1/32* | (2007.01) | |
| *H02M 1/00* | (2006.01) | |
| *H02M 3/156* | (2006.01) | |

(52) U.S. Cl.
CPC .......... *H02M 3/157* (2013.01); *H02H 1/0007* (2013.01); *H02H 9/02* (2013.01); *H02M 1/32* (2013.01); *H02M 2001/0009* (2013.01); *H02M 2003/1566* (2013.01)

(58) Field of Classification Search
CPC ....... H02M 3/1588; H02M 2001/0045; H02M 3/157; H02M 1/32; H02M 2001/0009; H02M 2003/1566; H02H 9/02; H02H 1/0007
See application file for complete search history.

(56) References Cited

U.S. PATENT DOCUMENTS

| | | | | |
|---|---|---|---|---|
| 2006/0022653 A1* | 2/2006 | Reed | ............... | H02M 3/158 323/282 |
| 2011/0234187 A1* | 9/2011 | Brown | ................ | H02M 3/1588 323/282 |
| 2012/0293156 A1* | 11/2012 | Galbis | ................ | H02M 3/1588 323/350 |

(Continued)

*Primary Examiner* — Kyle J Moody
(74) *Attorney, Agent, or Firm* — Xsensus LLP

(57) ABSTRACT

A device, a circuit, and a method for current bypass are provided. The device includes circuitry detects an overload condition at a switching regulator output, enables a current bypass path including a linear current source in response to detecting the overload condition, and digitizes a difference between a load current and a switching regulator output current. The linear current source generates an active current assist signal based on the digitized difference between the load current and the switching regulator output current.

19 Claims, 5 Drawing Sheets

(56) References Cited

U.S. PATENT DOCUMENTS

2015/0346749 A1* 12/2015 Bernardon .............. G05F 1/575
                                                                   323/274
2017/0033811 A1* 2/2017 Heo ..................... H04B 1/0475
2017/0117717 A1* 4/2017 Pagano .................. H02J 50/80

* cited by examiner

METHOD AND APPARATUS FOR BYPASSING CURRENT GENERATION IN PARALLEL WITH SWITCHING REGULATOR

CROSS-REFERENCE TO RELATED APPLICATIONS

This application claims the benefit of priority from U.S. Provisional Application No. 62/443,209 filed Jan. 6, 2017, the entire contents of which are incorporated herein by reference.

BACKGROUND

Technical Field

The present disclosure is directed to switching regulators and in particular switching regulators having small current ratings.

Description of the Related Art

Existing switching regulators with small current ratings use active pull down clamps to sink negative currents which increase circuit losses. Existing buck/switch-mode power supplies used in envelope tracking power supplies for wireless communication also have an unacceptably large footprint. Therefore, there remains a need for regulator circuits with reduced circuit losses and smaller footprints.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
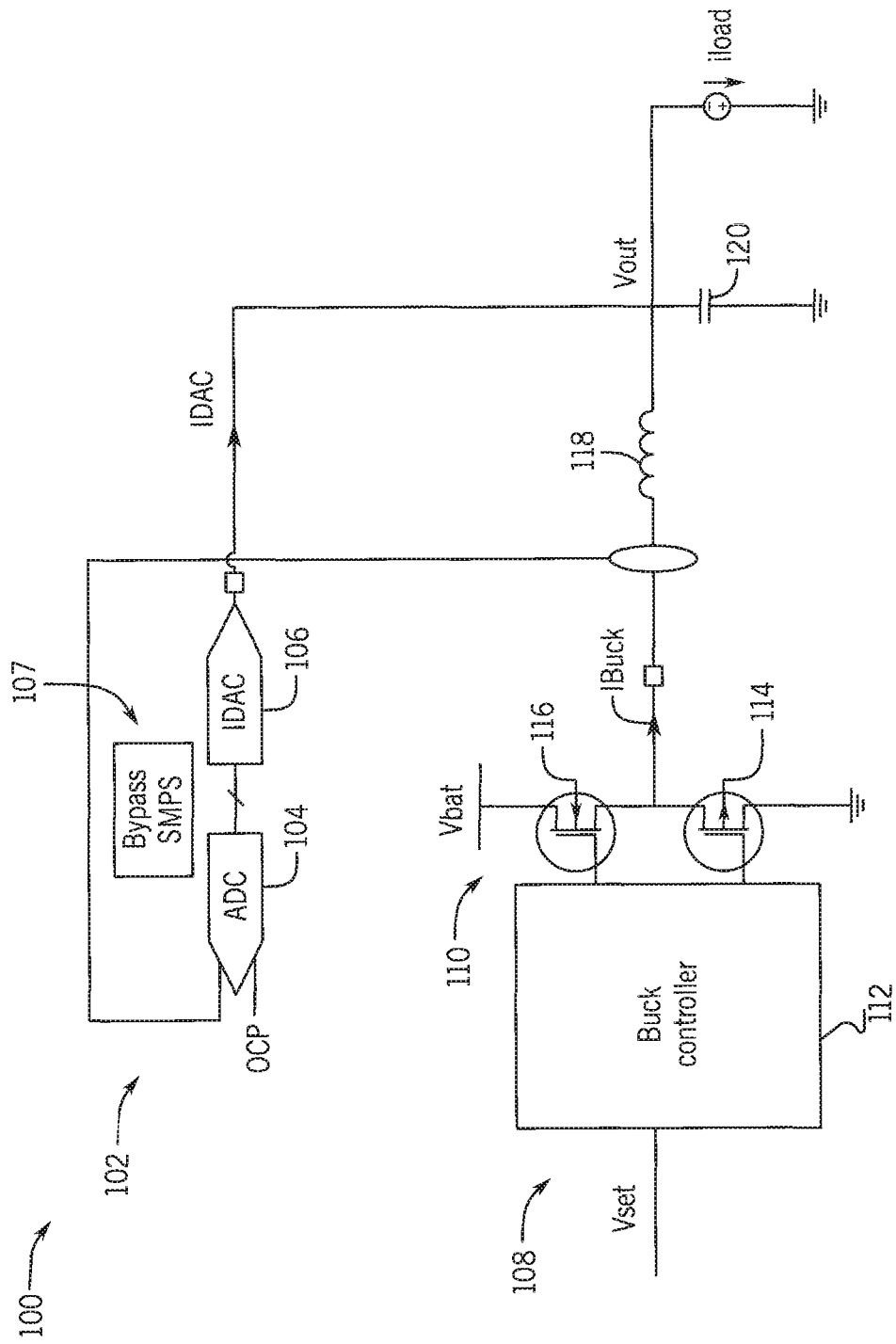
FIG. 1 is an exemplary schematic diagram of a switching regulator with a current bypass according to aspects of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Referring now to the drawings, wherein like reference numerals designate identical or corresponding parts throughout several views, the following description is generally directed to the generation of a bypass current in parallel to the existing switching regulator output to handle larger output current. Aspects of the present disclosure are directed to a method and apparatus for generating a bypass current in parallel with an existing switching regulator to be able to support larger loads than the switching regulator is rated for so that smaller inductors may be used.

As wireless communication standards evolve due to higher and higher data rate demand, both signal bandwidth/complexity and spectral efficiency requirements grow over the years. As a result, the mobile handsets may need to handle signals with wide channel bandwidths and high peak-to-average power ratios (PAR). To maintain high efficiency at all power levels, an envelope tracking power supply (ETPS) is commonly used as a power amplifier supply module. The ETPS may include a linear amplifier and a buck/switch-mode power supply (SMPS). The linear amplifier (e.g., high speed linear amplifier) acts as an independent voltage source with programmable gain, and is responsible for the high linearity. The linear amplifier regulates an output voltage and supplies a fast varying small portion of the load current. The buck/SMPS acts as a dependent current source to supply the slow varying but large portion of the load current responsible for the high efficiency. With the ultimate multimode multiband solutions, the SMPS not only needs to support 3G/4G data with a lower average current but also occasionally needs to support 2G data with a much larger average current. Conventionally, the SMPS and an output inductor of the circuit are sized accordingly. Because of this, the efficiency loss due to power switching in the integrated circuit (IC) chip and the footprint of the output inductor on the printed circuit board (PCB) may become unacceptably large.

The exemplary methods and circuits described herein use parallel current paths to adjust for the extra current demand. The circuits and methodologies described herein provide a smaller buck sizing with better pulse frequency modulation (PFM) efficiency due to smaller power stage size, resulting in a smaller switching loss. The circuit has a smaller output inductor size/footprint, better on-shelf availability, and cheaper price. In one implementation, there is a 2.5× size reduction for 1.5 A rated vs 3 A rated output inductor.

The description below makes reference to switching regulators and ETPS in devices that include RF amplifiers such as user equipment (UE). UE may take many different forms and have many different functions. As one example, UE may be a 2G, 3G, or 4G/LTE cellular phone capable of making and receiving wireless phone calls, and transmitting and receiving data. The UE may also be a smartphone that, in addition to making and receiving phone calls, runs any number or type of applications. The UE may be a connectivity platform supporting Wireless LAN (WLAN), Bluetooth and other communication standards. UE may be virtually any device that transmits and receives information, including as additional examples a driver assistance module in a vehicle, an emergency transponder, a pager, a satellite television receiver, a networked stereo receiver, a computer system, music player, or virtually any other device. The techniques discussed below may also be implemented in other devices, such as a base station or other network controller that communicates with the UE, as one of ordinary skill would recognize.

FIG. 1 is an exemplary schematic diagram of a switching regulator 100 with a current bypass 102 according to one example. The switching regulator 100 includes two parallel output current paths (IBuck and IDAC) to support a load current Iload. The Buck is from the SMPS 108 that includes a buck controller 112 and a power stage 110 with high side (HS) in PMOS 116 and low side (LS) in NMOS 114. The SMPS 108 receives an input voltage and produces a regulated output voltage stored across the output capacitor 120. The PMOS 116 is coupled to an external voltage source such as a battery (Vbat). The NMOS 114 is coupled to the ground. The buck controller 112 produces a modulated signal to alternately turn the PMOS transistor 116 and the NMOS transistor 114 ON and OFF over a switching cycle to couple current from the external voltage source and ground into an output inductor 118, respectively. The SMPS's output, IBuck, is coupled to the output node Vout through the output inductor 118. The SMPS and the output inductor may have the same current rating. For example, the buck controller may be 1.5 A rated, and then the output inductor may be 1.5-A rated as well which is easily available, cheap and has a small form factor.

The switching regulator 100 uses existing over current protection (OCP) to set switching regulator output current so that switching regulator takes as much current as it can to provide improved efficiency. The current bypass 102 may include a tracking analog-to-digital (ADC) 104 to digitize a difference between total loading and SMPS output current. The digital output results are fed into a pull-up current DAC (IDAC) 106 for bypass current generation, which can be referred to as active current assist. Since the input to ADC 104 is well defined, there is no control loop stability concern. The current bypass 102 may include a hysteretic comparator with inductor current information to generate an active current assist enable signal. Active current assist is enabled when the SMPS's output 108 approaches a rating of the SMPS. The current bypass 102 may use an optional active pull down clamp, combined with existing over voltage protection, to limit the maximum output voltage. The active pull down clamp may be implemented as an analog or digital circuit. The clamp engages when the output voltage is higher than a predetermined threshold. The current from the clamp is proportional to the deviation of the output voltage from the predetermined threshold. The digital implementation provides the advantage that extra charge may be stored in output capacitor 120.

In one implementation, when the load current exceeds a first threshold, the active current assist is enabled. The active current assist is disabled when the load current is less than a second threshold. In one example, the first threshold may be larger than the second threshold to create a hysteresis window. The hysteresis window provides the advantage of saving power by turning off the linear current source when the active current assist is disabled and reducing the warm-up time when the active current assist is enabled.

The "IDAC" output current path includes the tracking ADC 104 and the IDAC 106 with output current IDAC flowing to the common SMPS output node Vout. A supply to the current bypass path is a second switching mode power supply Bypass SMPS 107 included in the device. When the Iload is below the rated current, the IDAC path is not activated as described previously herein. For example, if Iload is below 1.5 A, the IDAC path is not activated. In one example, when the sensed buck output current IBuck exceeds some preset HS over-current protection (OCP) threshold, the OCP comparator is triggered and OCP signal is toggled to high, indicating that the buck controller 112 cannot support Iload and IDAC path needs to be activated. The buck controller 112 behaves like a current source and the control loop is equivalently switched from voltage to current loop. As a result, the output voltage starts to drop down. Once the IDAC path is activated, the tracking ADC 104 starts to digitize the difference between Iload and IBuck. The digital output results are fed into the pull-up current DAC 106 for bypass current generation and bring the buck controller back to voltage mode to maintain output voltage regulation.

In one implementation, when the buck current (IBuck) is greater than 1.6 A, the IDAC is enabled for bypass current generation, and when IBuck is less than 1.4 A, the IDAC is disabled. When an inductor peak current exceeds 2 A, a buck overload limit for the buck controller triggers and limits the peak current to 2 A. At that moment, the buck controller 112 behaves as a current source and the current loop is switched from a voltage loop to a current loop. The tracking ADC generates a corresponding IDAC code to digitize the difference between the total loading and the switching regulator output current (ILoad−IBuck) and brings the buck controller back into voltage mode in order to maintain output voltage regulation.

In one implementation, the switching regulator may be a boost converter, a buck-boost converter, or any other type of switching regulators.

ADC and IDAC may have different number of bits and different resolution. ADC might also have a predetermined maximum step size as a function of the switching regulator's loop bandwidth. For example, the predetermined maximum step size may be determined such as to match up the slew rate with the switching regulator's loop bandwidth.

Figure 2:
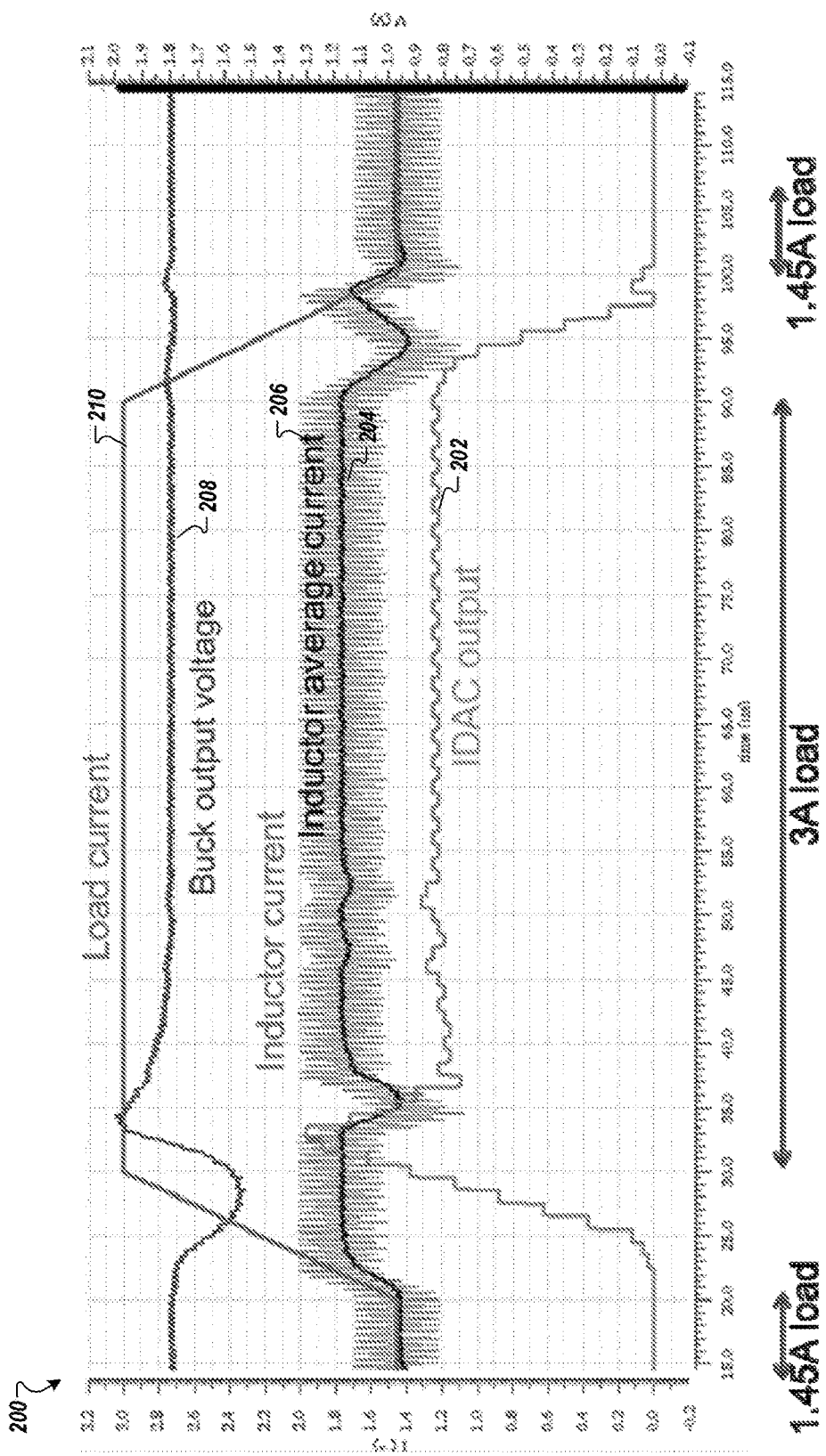
FIG. 2 is an exemplary graph of simulation results for the switching regulator according to aspects of the present disclosure.

FIG. 2 is an exemplary graph of simulation results for the switching regulator 100 shown in FIG. 1. Schematic 200 shows exemplary simulation results to illustrate the behavior when the SMPS load is switched from 1.45 A up to 3 A in 10 uS and then back down to 1.45 A in 10 uS. Load current 210, buck output voltage 208, IDAC output 202, inductor current 206, and average inductor current 204 are shown in schematic 200. When the load current is 1.4 A, the IDAC output current is zero. Once the load current is switched to 3 A the enable signal is activated and the IDAC output current is 1.2 A. The IDAC generates enough current to support the buck controller. The average inductor current 204 also increases to 1.8 A. The buck output voltage 208, and the inductor current have some ripple when the voltage is switched but settle after few microseconds.

The DAC can also have a different architecture to convert digital bits into analog current output with fast enough settling behavior.

In one implementation, the peak current may be detected as described previously herein. In other implementations, any form of the peak, average, or valley current detection may be implemented.

Figure 3:
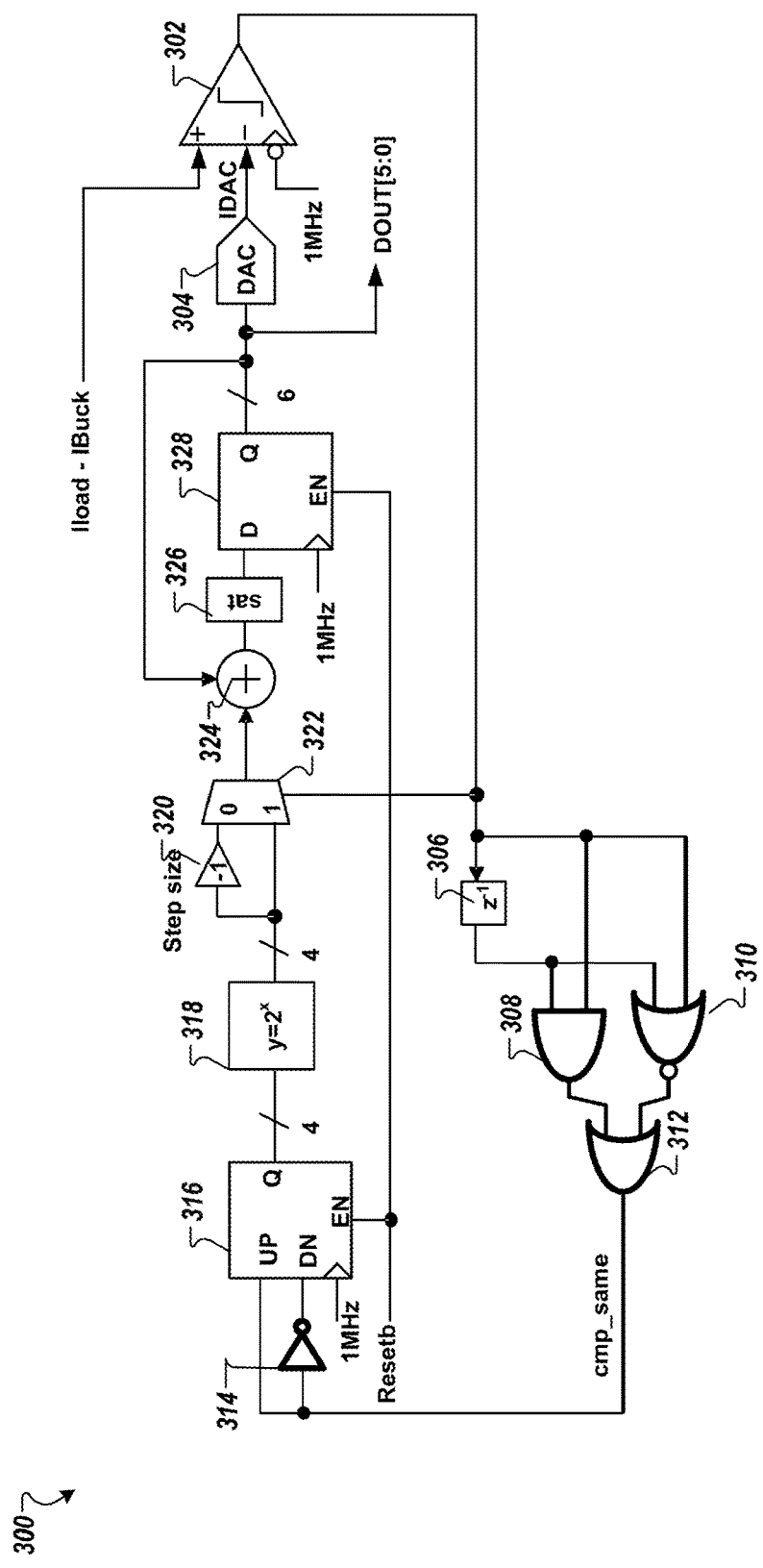
FIG. 3 is an exemplary schematic diagram of a tracking analog to digital converter according to one exemplary aspect of the present disclosure.

FIG. 3 is an exemplary diagram of a tracking ADC 300 according to one example. The tracking ADC 300 may include an up/down counter continuously clocked at a frequency which is usually less than the switching frequency of the switching regulator. The up/down control line is a function of the output of a comparator 302. The comparator 302 receives as an input the difference between the load current and the buck current, and the output current from the DAC 304. The output of the comparator 302 is provided to a block $z^{-1}$ 306 where a hold and delay happen. The historical value of the output of the comparator 302 from previous clock cycle can be accessed through that delay $z^{-1}$ 306, which, together with current comparator output, are provided to the input pins of an AND gate 308 and an NOR gate 310, which perform an AND operation and a NOR operation between the inputs, respectively. The output of the AND gate 308 and the output of the NOR gate 310 are provided to the input pins of an OR gate 312 which performs an OR operation between the output of the AND gate 308 and the output of the NOR gate 310. The output of the OR gate 312 is provided to a NOT gate 314 and to a counter 316 which track the input. The output of the NOT gate 314 is fed to the Down input of the counter and the output of the OR gate 312 is fed to the Up input of the counter 316. The counter 316 is clocked with a clock of 1 MHz in one example. The output of the counter 316 is provided to block $y=2^x$ 318 which provides the weighted bit to determine the step size for next cycle. The output from the $y=2^x$ block 318 is provided to an inverter 320 and to a two to one multiplexer 322 clocked by the output of the comparator 302 which selects as an output the output of block 318 or the output of the inverter 320. The output of the multiplexer 322 is provided to an adder 324. The adder 322 also takes as input the output of a D-Flip Flop 328. The output of the adder 324 is provided to a saturate circuit 326 which performs a saturate operation. The output of the saturate circuit 326 is provided to the D-flip flop 328 which performs a zero-hold. The D-flip flop output is coupled to the DAC 304. The tracking ADC 300 provides a fast response and accurate response in detecting small input changes.

The switching regulator described herein can be used in cellphone, WI-FI, and any other products that include RF power amplifiers. For example, the switching regulator can be used in an envelope tracking supply module and switching regulators that may occasionally have a large supply current but also have a small current rating so a small footprint inductor can be used to make the produce more compact.

Figure 4:
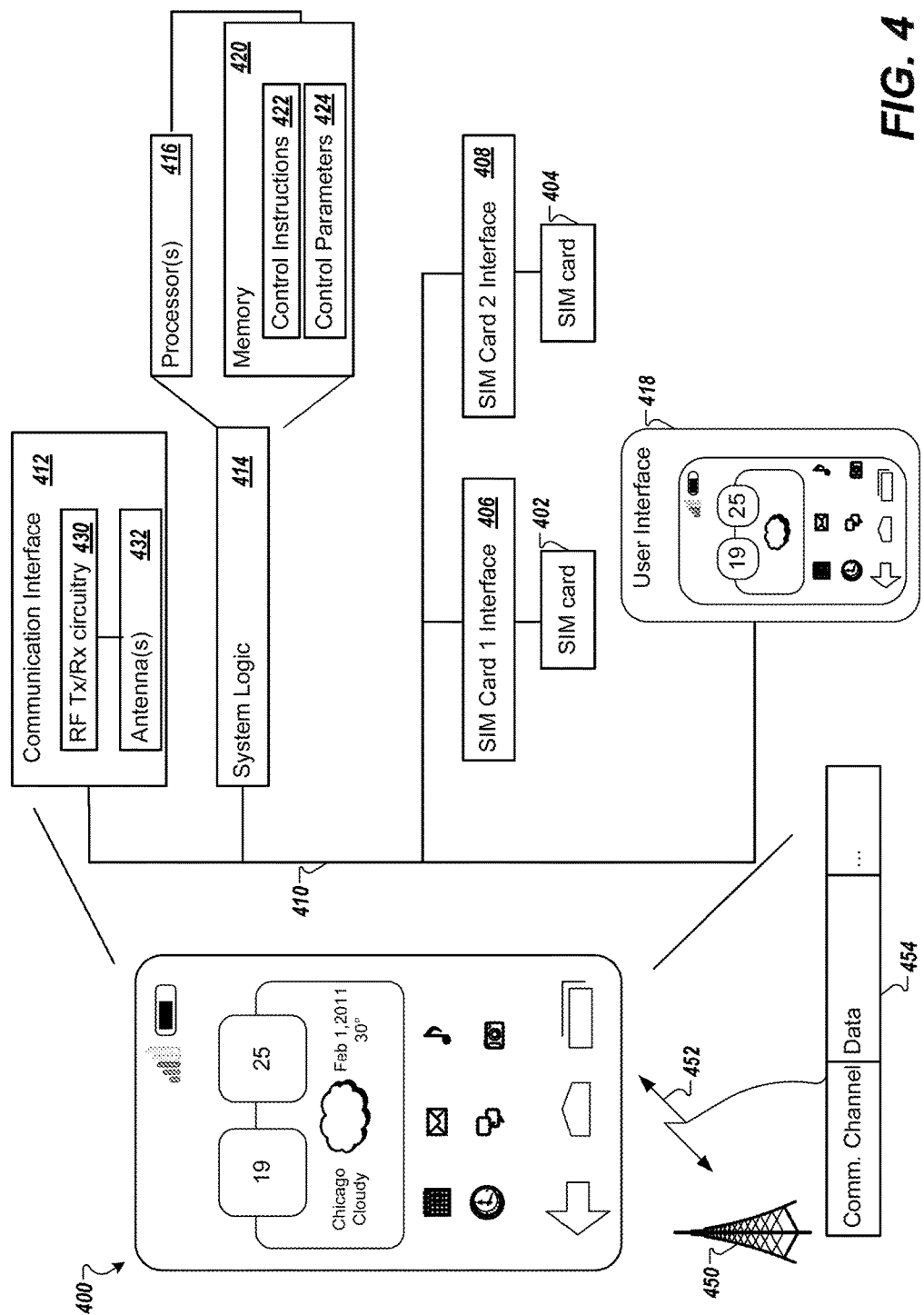
FIG. 4 is an exemplary diagram of a user equipment according to aspects of the present disclosure.

FIG. 4 shows a particular example of a UE 400 in which the direct connection techniques of the switching regulator may be implemented. In this particular example, the UE 400 is a smartphone, but as noted above, the UE may be virtually any type of electronic device. The UE 400 is in communication with a network controller 450, such as an enhanced Node B (eNB) or other base station. The network controller 450 and UE 400 establish communication channels 452 and exchange data 454 of any type. In this example, the UE 400 supports one or more Subscriber Identity Modules (SIMs), such as the SIM1 402 and the SIM2 404. Electrical and physical interfaces 406 and 408 connect SIM1 402 and SIM2 404 to the rest of the user equipment hardware, for example, through the system bus 410.

The UE 400 includes a communication interface 412, system logic 414, and a user interface 418. The system logic 414 may include any combination of hardware, software, firmware, or other logic. The system logic 414 may be implemented, for example, in a system on a chip (SoC), application specific integrated circuit (ASIC), or other circuitry. The system logic 414 is part of the implementation of any desired functionality in the UE 400. In that regard, the system logic 414 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 418. The user interface 418 may include a graphical user interface, touch sensitive display, voice or facial recognition inputs, buttons, switches, speakers and other user interface elements.

In the communication interface 412, Radio Frequency (RF) transmit (Tx) and receive (Rx) circuitry 430 handles transmission and reception of signals through the antenna(s) 432. The communication interface 412 may include one or more transceivers. The transceivers may be wireless transceivers that include modulation/demodulation circuitry, digital to analog converters, shaping tables, analog to digital converters, filters, waveform shapers, filters, pre-amplifiers, power amplifiers and/or other logic for transmitting and receiving through one or more antennas, or (for some devices) through a physical (e.g., wireline) medium. In particular, the communication interface 412 may include the switching regulator described previously herein. A wide variety of chipsets, available from Broadcom Corporation of Irvine Calif., may implement any desired functionality in the UE 400.

The UE 400 may implement any desired wired or wireless communication technologies. Accordingly, the transmitted and received signals may adhere to any of a diverse array of formats, protocols, modulations (e.g., QPSK, 16-QAM, 64-QAM, or 256-QAM), frequency channels, bit rates, and encodings. As one specific example, the communication interface 412 may support transmission and reception under the 4G/Long Term Evolution (LTE) standards. The enhancements described herein to the switching regulator are applicable to other communications technologies whether arising from the 3rd Generation Partnership Project (3GPP), GSM® Association, Universal Mobile Telecommunications System (UMTS), High Speed Packet Access (HSPA)+, or other partnerships or standards bodies. Note also that the UE 400 may implement any other desired communication technologies, including 802.11 a/b/g/n/ac/ad, Bluetooth, and Near Field Communications, as just a few examples.

The system logic 414 may include one or more processors 416 and memories 420. The memory 420 stores, for example, control instructions 422 that the processor 416 executes to carry out desired functionality for the UE 400. The control parameters 424 provide and specify configuration and operating options for the control instructions 422.

Figure 5:
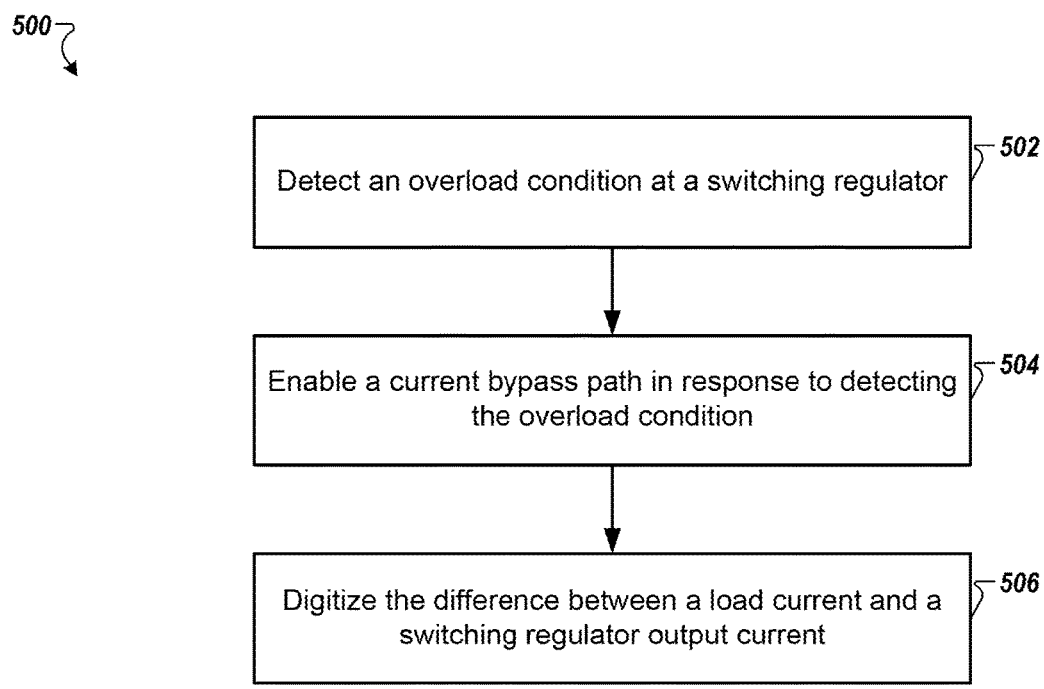
FIG. 5 is a flowchart for a method for bypass current generation according to one exemplary aspect of the present disclosure.

FIG. 5 is a flowchart for a method 500 for bypass current generation according to one example. At step 502, an overload condition may be detected via the OCP circuit when the output current from the SMPS 108, Ibuck, exceeds a predetermined threshold. The overload condition may also be detected based on an average current or a peak current. At step 504, the current bypass path is enabled in response to detecting the overload condition. At step 506, a difference between Iload and Ibuck is digitized using an ADC. The digitized output is fed to the output node. In one implementation, the current bypass may be enabled temporarily during a load attack to help SMPS settle quicker and reduce the output voltage ripple.

Advantages provided by the switching regulator described herein include that the switching regulator does not need to sink negative current with an active pull down clamp, which improves circuit efficiency. The switching regulator also has low overhead due to having a relatively simple control method that does not regular complex and costly hardware. Also, because the tracking ADC is used, there is not a control loop stability concern. The switching regulator provides small output variation, no stability concerns, better efficiency, and low cost due to small die size.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A device comprising:
   circuitry configured to
   detect an overload condition at a switching regulator output;
   enable a current bypass path including a pull-up current digital-to-analog converter (IDAC) as a linear current source in response to the overload condition; and
   digitize a difference between a load current and a switching regulator output current, wherein the linear current source generates an active current assist signal based on the digitized difference between the load current and the switching regulator output current.

2. The device of claim 1, wherein the circuitry includes two current supply paths parallel to each other and coupled to an output node with an inductor on one path.

3. The device of claim 2, wherein a first path is coupled to a switching mode power supply through the inductor.

4. The device of claim 3, wherein a second path is coupled to the current bypass path, which includes the pull-up current digital-to-analog converter (IDAC).

5. The device of claim 1, wherein the current bypass path includes a pull down active clamp.

6. The device of claim 1, wherein a supply to the current bypass path is a second switching mode power supply included in the device.

7. The device of claim 1, wherein the overload condition is detected when the load current is larger than a first threshold.

8. The device of claim 7, wherein the circuitry is configured to
disable the current bypass path when the load current is less than a second threshold.

9. The device of claim 1, wherein the overload condition is detected when the switching regulator output current exceeds a predetermined over current protection threshold.

10. The device of claim 1, wherein the circuitry is further configured to:
activate the current bypass path for a predetermined time during a load attack.

11. The device of claim 1, wherein the switching regulator output current is sensed through any form of peak, valley, or average current detection.

12. A circuit comprising:
   a switch mode power supply; and
   a bypass circuit including a pull-up current digital-to-analog converter (IDAC) as a linear current source configured to activate when an overload condition is detected at an output of the switch mode power supply, the linear current source generating, when active, a current as a function of a difference between a load current and a switch mode power supply current.

13. The circuit of claim 12, wherein the bypass circuit includes a tracking analog to digital converter.

14. The circuit of claim 12, wherein the bypass circuit includes a comparator configured to:
   compare the switch mode power supply current to a predetermined threshold; and
   activate the bypass circuit when the switch mode power supply current exceeds a predetermined threshold.

15. The circuit of claim 12, wherein the bypass circuit includes a pull down active clamp.

16. The circuit of claim 12, further comprising:
   a second switching mode power supply as a supply to the bypass circuit.

17. A method comprising:
   detecting an overload condition at a switching regulator based on a difference between a load current and a switching regulator output current;
   digitizing the difference between the load current and the switching regulator output current; and
   enabling a current bypass path including a pull-up current digital-to-analog converter (IDAC) as a linear current source in response to detecting the overload condition, wherein the linear current source generates an active current assist signal based on the digitized difference between the load current and the switching regulator output current.

18. The method of claim 17, wherein the overload condition is detected when the switching regulator output current exceeds a predetermined over current protection threshold.

19. The method of claim 18, wherein the current bypass path includes a comparator configured to compare the switching regulator output current to the predetermined over current protection.

* * * * *